United States Patent
Volkaerts et al.

(10) Patent No.: US 7,433,358 B1
(45) Date of Patent: Oct. 7, 2008

(54) CHARACTERIZATION OF IMPAIRED INTERVALS IN A VOICE OVER PACKET SESSION USING AUDIO FRAME LOSS CONCEALMENT

(75) Inventors: Paul Volkaerts, Wokingham (GB); Kevin Joseph Connor, Blaine, WA (US); James C. Frauenthal, Colts Neck, NJ (US); Rajesh Kumar, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 11/177,939

(22) Filed: Jul. 8, 2005

(51) Int. Cl.
*H04L 12/56* (2006.01)
*H04L 12/28* (2006.01)

(52) U.S. Cl. .................. 370/394; 370/252; 370/474; 370/476; 714/761; 714/762; 714/776; 709/231; 709/234; 704/210; 704/214; 704/215; 704/216; 704/217

(58) Field of Classification Search ............... 370/235, 370/242, 252–253, 244, 352, 356, 394, 474, 370/476, 503, 508, 509, 516, 517; 714/761–762, 714/776; 375/354, 356, 359; 709/231, 234, 709/237, 238, 240; 704/210, 214–217, 207, 704/233
See application file for complete search history.

(56) References Cited

U.S. PATENT DOCUMENTS

| 6,930,982 | B2 * | 8/2005 | Jagadeesan | 370/252 |
| 7,006,511 | B2 * | 2/2006 | Lanzafame et al. | 370/412 |
| 7,013,267 | B1 * | 3/2006 | Huart et al. | 704/207 |
| 2004/0073692 | A1 * | 4/2004 | Gentle et al. | 709/231 |
| 2005/0058145 | A1 * | 3/2005 | Florencio et al. | 370/412 |
| 2005/0166124 | A1 * | 7/2005 | Tsuchinaga et al. | 714/776 |

\* cited by examiner

*Primary Examiner*—Tuan A Tran
(74) *Attorney, Agent, or Firm*—Marger Johnson & McCollom, P.C.

(57) ABSTRACT

An embodiment may include an apparatus comprising a dejitter buffer to receive packets containing audio data, a codec coupled with the dejitter buffer, the codec to receive coded audio frames from the dejitter buffer and decode them, and a concealed seconds meter coupled with the dejitter buffer, the concealed seconds meter to record concealment events by the decoder to provide an objective measure of media impairment. Another exemplary embodiment may be a method comprising receiving packets containing audio information at a dejitter buffer, decomposing the packets to coded audio frames, sending the coded audio frames to a decoder and decoding the frames, generating a concealment output stream if the decoder does not receive a valid frame from the dejitter buffer, and recording concealment events to provide an objective measure of media impairment.

23 Claims, 7 Drawing Sheets

CHARACTERIZATION OF IMPAIRED INTERVALS IN A VOICE OVER PACKET SESSION USING AUDIO FRAME LOSS CONCEALMENT

BACKGROUND

Conventional telephone conversations take place over a circuit switched network. A circuit-switched network involves a dedicated physical path for a single connection between two end-points for the duration of the connection. In the Public Switched Telephone Network (PSTN), a telephone service provider dedicates a physical path between two end-points to a called number for the duration of a call.

In contrast to circuit switched networks, packet switched networks can be used to transmit telephone calls without requiring a dedicated connection, which leads to reduced costs. Packet switched networks typically use protocols to divide messages or data into packets. Division into packets allows each packet to be transmitted individually. In most packet switched networks, packets are allowed to follow different routes to a destination. After the packets arrive at the destination, they can be recompiled into the original message. An example packet switched network is the global computing network often referred to as the Internet.

Example packet switched networks may use Transmission Control Protocol/Internet Protocol (TCP/IP), X.25, and Frame Relay protocols. In contrast to circuit switched networks that were conventionally used for real-time communications, packet switching allows for delays in transmission, and provides extra control such as retransmission of data, recognition of duplicate messages, flow control mechanisms, etc. In general, packet switched networks provide a robust system for information transfer. Additionally, packet switched networks provide a low cost solution for information transfer since it does not require dedicated leased paths between endpoints.

Improvements in communications and computing technologies allow conventional real-time applications over a packet switched network. For example, in a voice over Internet Protocol (VoIP) network, the audio phone information is converted from analog to digital and encapsulated in packets to send through packet switched networks. This allows for delivery of audio information at a much lower monetary cost than through a dedicated PSTN circuit, however it has an associated cost in the quality of the communication.

Low-bit-rate audio codecs (coder/decoders) and digital signal processing (DSP) techniques may be employed to conserve bandwidth in voice communications, but may degrade the quality of a voice signal.

Various means have been employed to measure voice quality in telecommunications networks. For linear systems, objective audio measurements such as frequency response and signal-to-noise ratios are typical. To estimate user experience, subjective test methodologies such as ACR (absolute category ranking) are employed. MOS (mean-opinion-scores) is an example of an ACR test, in which users are presented with audio material and make listening judgments about quality on a five-point scale (1-bad, to 5-excellent).

Voice-over-Packet systems require new quality metric methodologies. MOS tests are non-real-time experiments involving human listeners, and cannot be run directly on revenue-generating calls, although predictions of MOS scores can be made. The use of non-linear, low-bit-rate audio codecs such as ITU standard G.729 means that some traditional measurements of audio quality such as frequency response cannot be used since linear methods cannot characterize a non-linear system.

For voice-over-packet transmission systems, it is desirable to monitor the voice quality of a particular connection or call for test purposes, and in order to monitor or regulate service. An example of service regulation is an SLA or service level agreement between telecommunication service providers which dictates minimum performance standards and specifies penalties for non-compliance.

It is desirable for a voice-over-packet endpoint to be capable of measuring quantities relevant to its local voice quality situation, and to report these quantities to concerned higher level entities, for example to billing or logging servers. It is further desired that such measurements be objective or numerical in nature, simple, unambiguous, require very little computation, and be based on information sources that are readily available in the endpoint. It is desired that such measurements be useful, for example, producing an output which can be employed directly by concerned entities, without requiring additional translation or calculation.

Finally, it is desired that such a metric be both perceptually relevant and effective, meaning strongly correlated with the subjective experience of users.

A wide variety of methods for measuring and reporting voice quality statistics of interest from voice-over packet processing devices are employed. Many of these techniques follow directly from established practices in both the traditional voice-telecom and data-communications fields, which reflects the hybrid audio/data nature of voice-over-packet systems.

The fundamental transport mechanism for voice-over-packet telecommunication systems is data packets, which are generated at a transmitter and sent at regular, short intervals to a receiver. The primary voice quality impairment of interest is the phenomenon of 'packet loss', in which packets from the transmitter do not arrive at the receiver at the required moment, for whatever reason. The receiver is then forced to generate a 'fake' or 'concealment' audio frame in an attempt to minimize the user annoyance that would result from the audio dropout or silence caused by the missing audio.

The phenomenon of packet loss is widely understood to be a primary source of voice quality degradation due to transmission network impairment. Voice-over-packet equipment has typically reported packet counts, such as 'packets received', 'packets lost', 'late packets', 'early packets' etc. as a primary voice quality metric. This is a metric which comes from data-network viewpoint. However, packet loss counts can be ambiguous, as vendors employ widely different definitions of packet 'loss' and 'discard' events. Also, since these quantities are typically reported only at the end of a call, it is not possible to determine from a packet loss count or rate whether the loss events occurred in a single burst, or spread out over time.

In the transition of the PSTN from analog to digital transmission, telecom engineers defined a formulation known as 'errored seconds', applied to digital transmission trunks, for use in billing, troubleshooting, and SLA monitoring. In the digital trunk case, the fundamental voice quality error mechanism is the bit-error. A 'T1/E1 errored second' and 'T1/E1 severely errored second' were defined as one-second intervals in which >TE or >TS bit errors were observed, with TE and TS being thresholds for 'errored' and 'severely errored' respectively. This is a well-known formulation for expressing the impact of an impairment whose intensity is expected to change over time.

It has been suggested to express the data-oriented metric of interest, packet loss, in the telecom-oriented errored-seconds formulation to obtain a time-based voice quality metric relevant to voice-over-packet systems. However, there are fundamental problems with a direct analogy. All packet loss leads to audio concealment, but not all audio concealment is the result of packet loss. Clock skew, clock drift, and internal equipment factors are additional phenomena which also lead to audio concealment.

What is needed is an objective metric for audio transmitted through a packet switched network, and particularly for voice data transmitted over a packet switched network.

BRIEF DESCRIPTION OF THE DRAWINGS

Embodiments of the invention may be best understood by reading the disclosure with reference to the drawings, wherein.

DETAILED DESCRIPTION

In the following description, numerous specific details are set forth. However, it is understood that embodiments of the inventions may be practiced without these specific details. In other instances, well-known circuits, structures, and techniques have not been shown in detail in order to not obscure the understanding of this description.

Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

Some embodiments use an objective measure of media impairment in voice over packet network environments. Example embodiments of voice quality monitoring applications may be embedded in voice over packet endpoints or located in packet "sniffers" that can monitor a packet network. A voice over packet endpoint may be any device that can transform audio information into data packets, and vice-versa. An example objective measure of media impairment is the use of audio frame loss concealment information, for example in a concealed seconds scheme.

Figure 1:
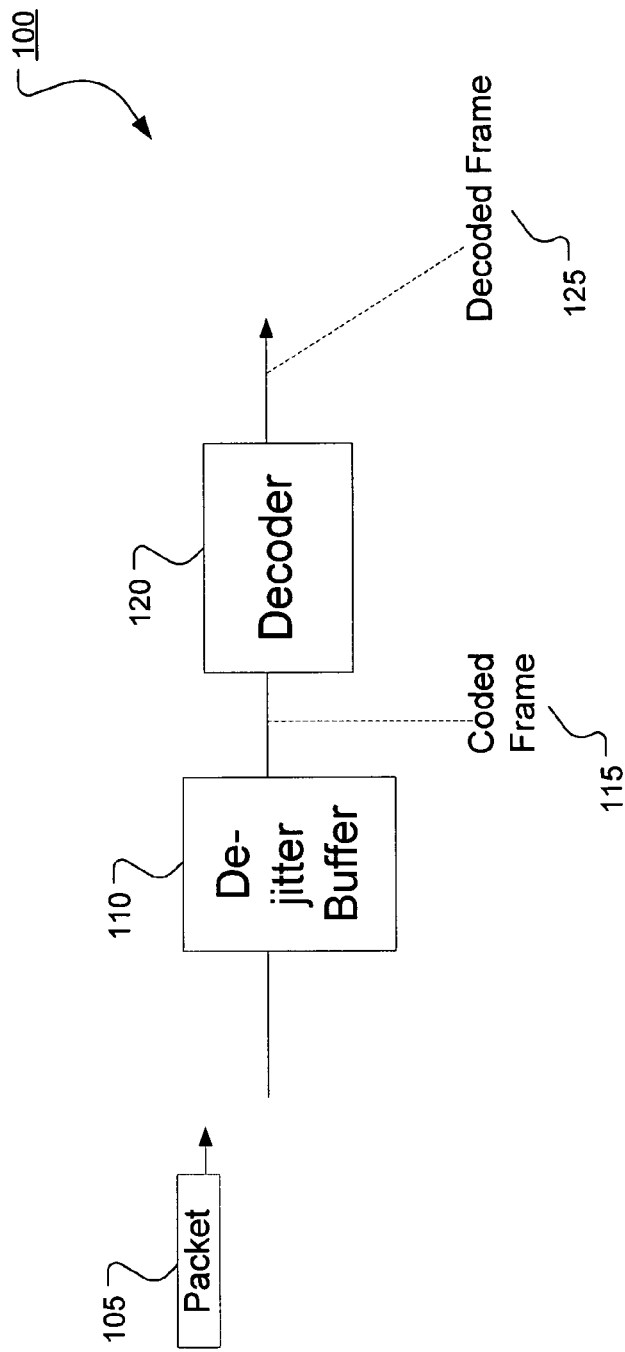
FIG. 1 illustrates a decoding device to decode packet data into audio signals.

FIG. 1 illustrates a decoding device 100 to decode packet data into audio signals. Decoding device 100 includes a dejitter buffer 110 that is coupled with an audio or speech decoder 120. Examples of speech decoders 120 include ITU standard speech codecs G.711, G.729, G.723. A speech codec 120 is a device that can convert linear audio samples into a coded frame (speech encoder) and vice-versa (speech decoder). A purpose of the codec is to produce a compressed or coded frame which is smaller than the decoded frame, hence transmission costs are reduced by sending the coded frame over the network as the payload or content of a network packet.

In some embodiments, the input and output 'frames' of a speech codec may be different sizes, expressed as bytes, but both necessarily represent the same 'amount' or duration of audio. For example, a G.729 codec operates with a native frame size of 10 ms. Coded G.729 frames are 10 bytes long, and represent 10 ms of audio. When decoded, this frame is expanded to a bitstream of 80 bytes of pulse code modulation (PCM) audio, which again corresponds to 10 ms duration. In this example, each concealment event comprises the generation of 10 ms of spoofed audio. Other speech codecs may employ different frame sizes. Although waveform codecs such as G.711 have no native frame size, the coded frame 115 is typically of a fixed duration, which shall be taken to be the effective frame duration for concealment accounting.

Referring to FIG. 1, a packet 105 may be received at the dejitter buffer 110. Typically, packets arrive at the dejitter buffer 110 asynchronously, that is, in a random fashion. The dejitter buffer 110 receives and stores packets 105 and may deliver the individual coded frames which constitute the payload of these packets to speech decoder 120. In an embodiment, the voice payload of packet 105 is at least one coded frame 115 comprising audio information. An example coded frame 115 is a G.729a frame, an international standard for voice coding that compresses 8 kHz sampled linear 16-bit audio signals and encodes them for transmission at 8 Kbps. Embodiments may also use other means to transfer audio or voice information between a dejitter buffer and a decoder.

Referring to the example in FIG. 1, the decoder 120 receives a coded frame 115 from the dejitter buffer and decodes it. The decoder 120 outputs a decoded frame 125. Some examples of decoder output may be analog or digital audio such as PCM audio, or even time division multiplexed (TDM) outputs. Since the decoding device 100 is providing a stream of audio, the decoder 120 operates synchronously with dejitter buffer 110 by either pulling or the dejitter buffer 110 pushing a coded frame at given intervals. In an embodiment, the decoder 120 may attempt to pull a new frame from the dejitter buffer 110 every 10 ms, as an example.

In the present example, if the dejitter buffer 110 provides a coded frame 115 for the decoder 120, and the coded frame is correct, the decoder 120 decodes the coded frame 115 and outputs a decoded audio stream. If the dejitter buffer 110 does not have a coded frame 115 to deliver or the coded frame 115 is judged by the decoder 120 to be in some way invalid, the decoder 120 faces a difficulty. There is no coded frame to decode. The decoder device 120 must either remain silent, or generate a 'best-guess' audio output frame 125 so as to reduce the user annoyance that must inevitably result from this decoder-underflow episode. This is known as an audio concealment event, regardless of the actual audio concealment mechanism employed.

Example audio concealment mechanisms used in voice over packet systems include silence, comfort noise, simple last-frame-replay, and sophisticated interpolation methods such as ITU standard G.711 appendix 1 Packet Loss Concealment.

However embodiments are not so limited, and concealment may be generated in any situation in which the decoder compensates for defects in its coded input stream. Various mechanisms, including but not limited to packet loss, may lead to audio concealment events. Examples of concealment-inducing events include dejitter-buffer resizing events in which case the dejitter buffer attempts to 'buy' or 'sell' time through instructing the speech codec to delete or create audio samples, differences in clock frequency between the audio sample input at the transmitter and audio sample output at the receiver which may lead to slow over- or underflow, and bit-errors in the packet header or payload.

Service providers and IT departments need an objective quality metric for voice transmitted over packet networks. An example embodiment may provide an objective metric of the loss of transmitted VoIP media frames. Embodiments may be used in performance trending and troubleshooting, as well as with other objective metrics such as delay, packet jitter, and audio levels to characterize overall media quality for service level agreement (SLA) purposes.

Some embodiments may distinguish between different severity levels of frame loss concealment and provide an indication of the burstiness of loss. Some embodiments may include an aggregation technique to allow overall characterization of frame loss performance across calls and across endpoints in a conglomeration of endpoints such as a media gateway or server.

Embodiments may use a frame loss concealment method as an objective measure of media impairment. The amount of actual frame loss concealment, as distinguished from unannounced silence at the edge of a voice over packet network, may be used. Other embodiments may provide a method and apparatus of characterizing bursty frame loss impairments.

In one embodiment, a concealment vector (CV) comprising a stream of information may be generated by observing a voice over packet endpoint. CVs may be generated based on actions or internal states of a dejitter buffer 110, a decoder 120, or both of them together, as examples. In an embodiment, CVs may be used to derive concealed seconds (CS) counts to use concealment information as an objective measure of media impairment. For example, a "1" may be written to a CV every time decoder creates a concealment frame of audio, while each non-concealed or normally decoded output frame causes a "0" to be written to the concealment vector. This is an example method to generate a CV.

In an exemplary embodiment, a concealed seconds meter may process CVs and determine different levels of impairment based upon the concealment events recorded in a CV. For example, a classification scheme may be generated such that a CS is a one second window in which greater than 0 ms concealment is observed, such as where concealment audio playout was required to mask frame loss. In this example the sampling windows may be non-overlapping and run independently of actual speech patterns. In an embodiment, a CV may be processed on the endpoint, or may be shipped out to an external processor, and may be analyzed and used to create/update CS reports.

In the present exemplary embodiment, a severely concealed second (SCS) can be defined as a non-overlapping one second window in which at least 50 ms (or 5%) of concealment is observed. In an embodiment these thresholds may be user defined, for instance, a user-defined concealed second (UCS) may be defined as a concealed second employing a threshold defined by a network operator. This would provide flexibility, but still may maintain other metrics to allow a constant point of comparison across vendors. An example metric that may be maintained across vendors is the SCS threshold of 50 ms.

In the present example, these first three metrics are analogous to PSTN T1/E1 errored seconds, and are suitable for aggregation across calls. A benefit of a concealed seconds scheme is that it is measured at the endpoint, where the concealment vector is directly observable, and it does not require classification of the loss event as being due to any particular phenomenon. Defining an errored second on a packet loss basis requires a number of special cases, with separate accounts depending on the phenomenon.

Furthermore, a concealed seconds method may be time-based, and does not require correction for different frame-per-packet encapsulations before aggregation. As mentioned in the example above, a concealed seconds approach also captures the effect of audible impairments which are not visible to packet loss based accounting, such as underflows due to clock skew. Therefore CS provide good time resolution and may be particularly well suited for SLA accounting.

CS-type embodiments may be based on intermediate figures-of-merit derived from the CV. In an embodiment, a figure of merit may be derived from CVs based on a defined scale. In one example the scale may be from 1 to 100. In this embodiment, a concealed second can be defined based any threshold of the intermediate scale. For example, a concealed second can be defined as any second in which the intermediate figure of merit is less than 50. Any number of intermediate quantities may be derived from the CV, and a CS-type measure can be obtained by application of a threshold decision to any of these intermediate quantities.

Voice-over-packet transmission systems which employ voice-activity-detection, or VAD, are subject to a particular failure mechanism which can lead to improper classification of packet loss or concealment events at a receiver. With VAD, the transmitter is typically active only during periods of talker speech. When the talker is silent, a reduced number of packets, or even zero packets, are sent. Clearly, it is important for the receiver to distinguish between periods of talker silence, in which no packets arrive, and periods of sustained packet loss, in which no packets arrive, and is hence identical.

Generally, the receiver is sent an explicit 'end-of-talkspurt' indication, which informs the receiver to interpret the subsequent packet drought as plain old talker silence. Some voice-over-packet systems employ the transmission of periodic silence description packets (SID) from the transmitter during periods of talker silence, which can provide a further indication that the packet drought is normal silence, and not packet loss.

It is possible, if highly improbable, that an 'end-of-talkspurt' indication packet is lost in transmission. In that event, it is truly impossible for the receiver to determine whether a current loss episode is due to real packet loss, or is merely 'unsignalled silence'. The former requires concealment events to be counted, the latter would require concealment events to be discounted, or ignored as false indications.

Three example solutions are presented. In general, the solution is to store the state of the concealment meter counters at the start of a multiple-consecutive concealment burst, but to continue updating the counters provisionally. The indeterminacy of the situation will be resolved by a subsequent event, such as the reception of a SID packet, the expiration of a timeout counter, or the arrival of RTP packets associated with the next talkspurt.

Depending upon the nature of the 'indeterminacy resolving event', the present state of the concealment counters is either accepted as valid, if for example the burst is judged to have been true packet loss, or the counters are 'rolled back' or restored to their pre-burst state, if for example the burst is judged to have been ordinary silence that was misidentified. The reception of a SID indicates a misidentified silence episode. The expiration of a timeout, for example of 1000 ms duration, can be used to judge the concealment episode to be misidentified silence, by counting on the fact that a sustained burst of 1000 ms packet loss is exceedingly improbable. The reception of a new talkspurt can be used to resolve the indeterminacy, through examination of the RTP sequence numbers. Contiguous sequence numbers across the gap, for example, indicate that the event was talker silence.

An embodiment may account for the burstiness of media impairments, the minimum, average and maximum burst sizes of concealed seconds, severely concealed seconds, user-defined concealed seconds by recording them for a VoIP session, as well as overall per-session counts of these metrics.

The overall duration of a session, which can be expressed as "use seconds" provides a weighting factor for these per session counts and allows correct comparisons of session performance.

In an embodiment, the counts of concealed seconds, severely concealed seconds etc. along with their burstiness, can be reported during a session or at its end. In addition, these counts can be aggregated into temporal history bins (e.g. hourly bins) for individual VoIP endpoints or for conglomeration of VoIP endpoints such as media gateways. When this is done, the counts of use seconds may also be included so that the volume of impairments is scaled by the volume of traffic.

An embodiment may determine a concealment ratio (CR) as a simple ratio of concealment duration to active speech duration. CR may be used for real-time alarms. Additionally, an end of call cumulative concealment ratio may be reported. If a cumulative concealment ratio is significantly different than a Real-time Transport Control Protocol (RTCP) derived packet loss cumulative ratio, a problem on the endpoint or clock skew is indicated.

For example, data trunking over IP calls (in which raw bits from a T1 channel are encapsulated and sent out over a VoIP channel with no voice processing) often exhibit high bit errors in their connection, even when there are zero lost packets. This is due to clock skew and may be detected by a cumulative CR. Therefore, CR provides good quality discrimination, even if not as well suited at time resolution as CSs are. In this regard, CRs is particularly well suited for alarms during a call in progress, for example, to launch a traceroute, etc.

The use of concealment events rather than 'packet loss' in the invention provides better correspondence with human perception, and circumvents a host of difficulties due to disagreement about the very definition of packet loss.

There are different types of packet loss, for example, there is true packet loss in which a packet fails to arrive at the receiver, and effective packet loss when a packet arrives too late to be played out in smooth sequence. There is also effective frame loss, that is, frame loss as experienced by a speech codec (decoder). A codec frame loss is the event in which no frame can be supplied to a decoder function, for any reason. This may be considered a decoder starvation event where the decoder attempts to minimize audible effects of the missing frame through an error concealment method. As mentioned above, this concealment method may be built-in to the codec, or may be a pre- or post-codec process (such as last-frame replay, or PLC for G.711).

A concealment based metric provides not only a measurement where it is needed, at the endpoint, but also may provide better resolution than a packet based metric. Often, each transmission packet encapsulates multiple frames. For example, a 30 ms packet may contain three G.711 data frames of 10 ms each. In the event this packet is never arrives, the result would inevitably be the loss of 3 frames at the decoder, hence 3 concealment frames will be played out.

However, if the packet in the present example is late, but not lost, it may be possible to play out one, two or all three of the G.711 frames, depending on how late the packet arrives. If one frame out of three in a packet may be used, a packet based metric may not provide an accurate resolution of the actual output audio.

For example, a packet based metric may count the entire late packet (30 ms) as lost, or to complicate accounting but provide accuracy, may count the packet as two-thirds lost. This example illustrates the benefit of using a concealed seconds approach to measure effectively lost frames as experienced by a speech codec.

Figure 2:
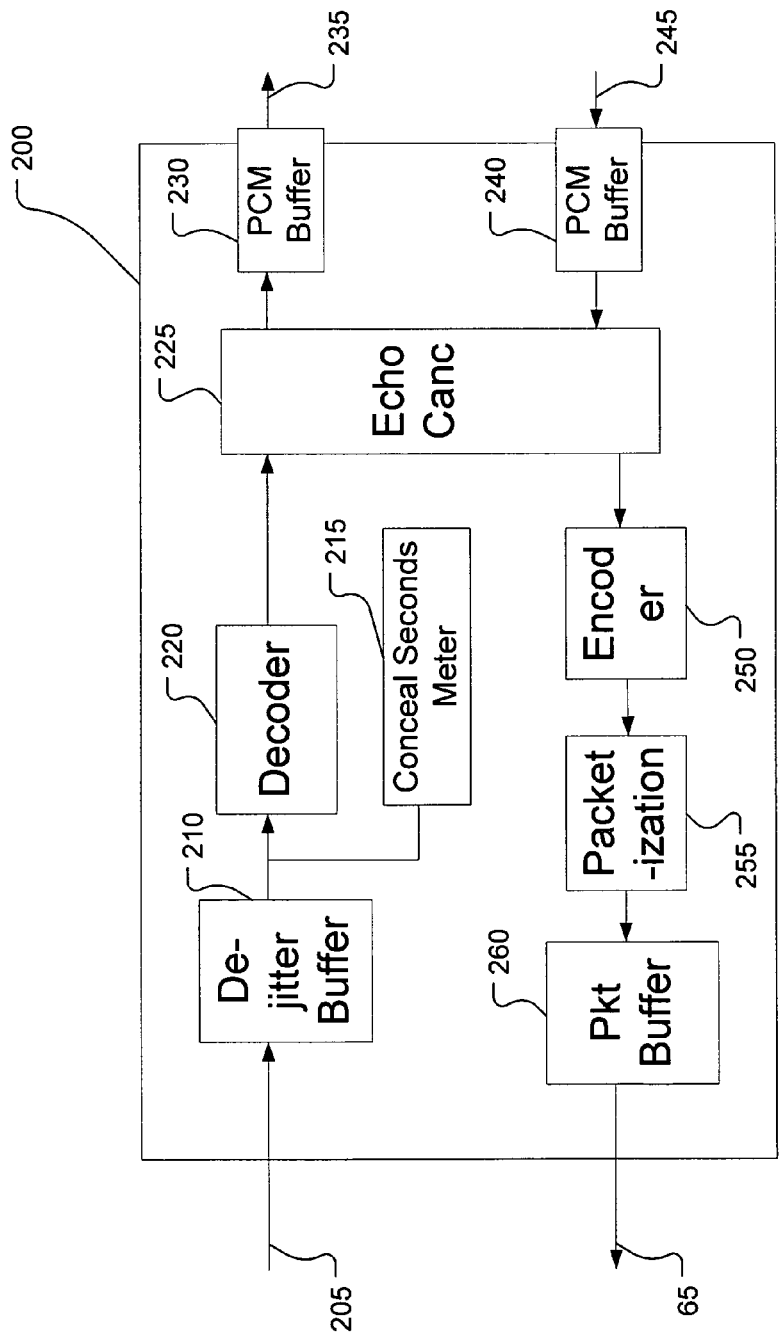
FIG. 2 illustrates an embodiment endpoint of the present invention that can use an objective measure to determine quality of VoIP data.

FIG. 2 illustrates an embodiment endpoint 200 of the present invention that can use an objective measure to determine quality of VoIP data. Referring to FIG. 2, endpoint 200 includes an input 205 to receive packetized audio information, such as VoIP, and provide it to dejitter buffer 210. Dejitter buffer 210 may then provide a synchronous stream of coded frames of audio information that is the payload from the packetized audio information, to decoder 220.

In the present embodiment, a concealed seconds meter 215 is coupled to the node between dejitter buffer 210 and decoder 220, observes and processes CVs to determinate different levels of impairment based upon the concealment events recorded in CVs, as explained in example embodiments above.

In one embodiment, endpoint 200 is included in a DSP device such as a VoIP endpoint device, but need not be so limited. For example, the dejitter buffer 210 and the decoder 220 may reside on separate processors. Additionally, a gateway may send a CV to another device, such as a laptop, where the laptop may comprise the CS meter. Generally, when a CS meter is informed of the state, success or failure, of decoder fetch events, the CS calculation can happen on any device.

In the present embodiment, the node between the dejitter buffer 210 and decoder 220 is a point in the signal flow where frames of coded audio are delivered, either pushed or pulled, to decoder 220. In this example, packets arrive at dejitter buffer 210 randomly and frames are requested from the dejitter buffer 210 by the decoder 220 synchronously, for example every 5 or 10 ms.

The decoder 220 outputs a signal containing audio information to echo canceller 225. The embodiment in the illustration outputs PCM audio information, but need not be so limited. In the present embodiment, echo cancellor 225 outputs PCM data to PCM buffer 230, which buffers the output audio before it is sent through output 235 to an audio interface.

The embodiment endpoint 200 also includes a PCM buffer 240 to receive audio data from input 245 which is coupled with an audio interface. In the present example, PCM buffer 240 provides audio signals to echo cancellor 225 which then provides echo cancelled audio signals to encoder 250. Encoder 250 then supplies encoded frames to a packetization block 255 that in turn provides packets comprising an audio payload to packet buffer 260 to be output through port 265.

An embodiment may comprise a dejitter buffer to receive packets containing audio data, a codec coupled with the dejitter buffer, the codec to receive coded frames from the dejitter buffer and decode them, and a concealed seconds meter coupled with the dejitter buffer, the concealed seconds meter to record concealment events by the decoder to provide an objective measure of media impairment.

Yet another embodiment may comprise an apparatus with means for receiving packets containing audio information at a dejitter buffer, means for decomposing the packets to coded frames, means for sending the frames to a decoder and decoding the frames, means for generating a concealment frame if the decoder does not receive a valid frame from the dejitter buffer, and means for recording concealment events to provide an objective measure of media impairment.

Figure 3:
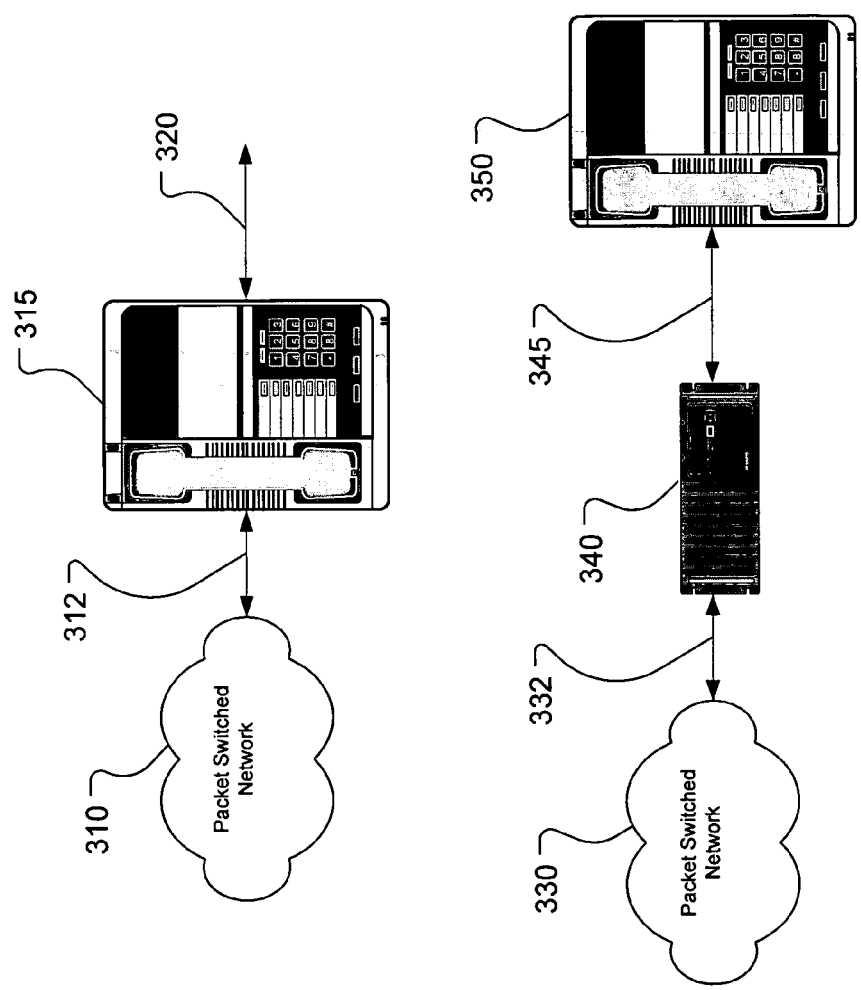
FIG. 3 illustrates two example endpoints operating at the edge of a voice over packet network.

FIG. 3 illustrates two example endpoints operating at the edge of a voice over packet network that may include embodiments of the present invention. Referring to FIG. 3, an embodiment may reside in a packet based telephone such as VoIP enabled telephone 315. An example VoIP enabled telephone is a Cisco VoIP telephone model number 7960. VoIP telephone 315 receives packets 312 from a packet switched network 310, for example an IP based global information network such as the Internet. VoIP telephone 315 includes a VoIP endpoint 200, and translates audio information between audio signals and IP packets comprising audio information as their payload.

FIG. 3 also illustrates another example embodiment to provide an objective metric of media impairment. In this example, an IP telephony terminal adapter 340 contains an concealed seconds enabled endpoint such as endpoint 200 described above. In this example, the packet switched network provides packets 332 to IP telephony terminal adapter 340, IP telephony terminal adapter 340 then provides audio information 345 to an analog phone interface such as a FXS interface coupled with an analog phone set 350.

Figure 4:
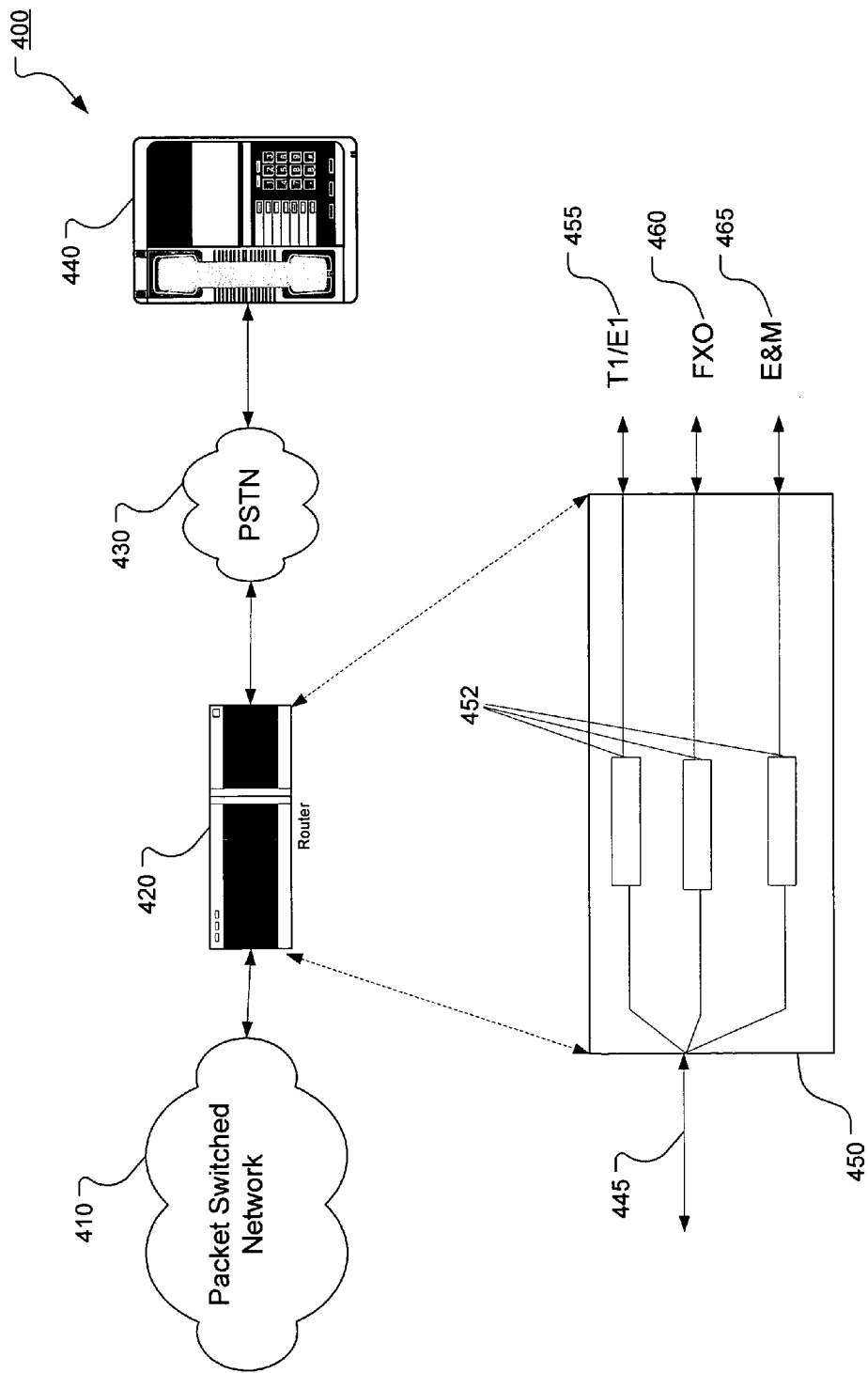
FIG. 4 illustrates an embodiment router operating at the edge of a voice over packet network.

FIG. 4 illustrates an embodiment router 420 operating at the edge of a voice over packet network. Referring to the FIG. 4, packet switched network 410 is coupled with router 420, router 420 is coupled through PSTN 430 with telephone 440. In this embodiment, router 420 may comprise one or more VoIP endpoints similar to endpoint 200 described above in FIG. 2.

FIG. 4 illustrates an example router 450 at the bottom of the figure that corresponds to router 420. In this example, router 450 receives packets 445 and may process them in different individual endpoints 452. Referring to the figure, the top endpoint 452 may receive packets and output digital phone signals, such as T1/E1 bitstreams 455. Similarly, other packets may be sent to the middle endpoint 452 which outputs analog phone information to an FXO interface 460. Another examplary endpoint in router 450 is the bottom endpoint 452 with an ear and mouth (E&M) output 465. Additionally, one endpoint may be created with multiple output formats.

Figure 5:
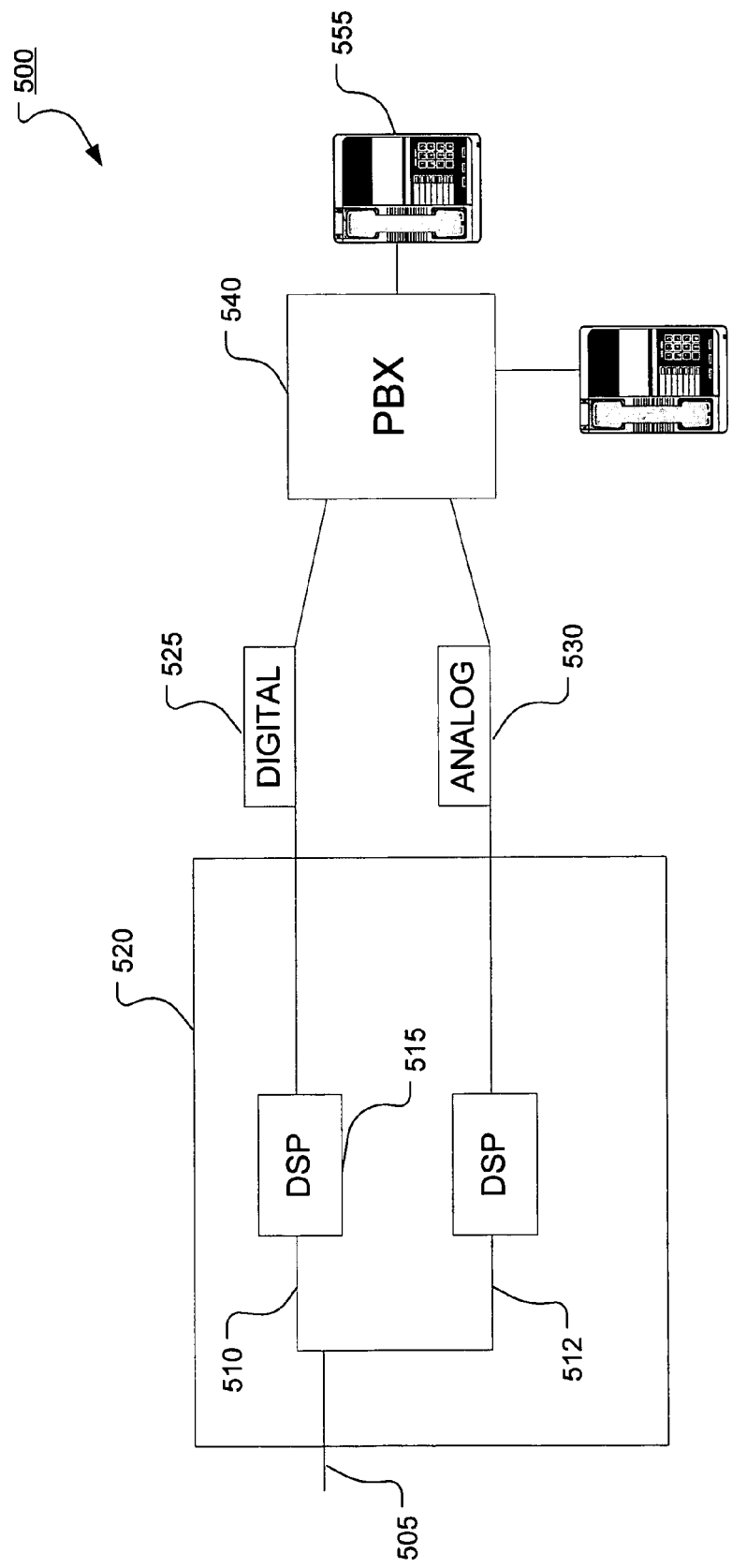
FIG. 5 illustrates an embodiment gateway comprising multiple endpoints operating at the edge of a voice over packet network.

FIG. 5 illustrates an embodiment gateway 520 comprising multiple endpoints operating at the edge of a voice over packet network. Referring to FIG. 5, a voice over packet gateway, such as VoIP gateway 520, may comprise multiple embodiment endpoints such as DSP 515. An example VoIP gateway 520 is a Cisco 3745 VoIP gateway.

In the present example, gateway 520 receives packets at 505 and directs packets 510 for a digital interface 525 through DSP 515, and can also direct packets 512 to another DSP to an analog interface 530. Example digital interfaces comprise a digital audio bitstream being sent through a T1/E1 digital PSTN interface to PBX 540. Analog interfaces include E&M, FXO or FXS interfaces, as examples. Referring to the figure, analog interface 530 is an analog PSTN interface that is coupled with PBX 540.

As shown, gateway 520 may comprise any number of endpoints such as DSP 515. In an embodiment, each DSP can handle multiple channels, and each channel can be a VoIP call. In this case, each actual channel may be considered a VoIP endpoint and each one therefore may transform audio data between packets and audio signals.

Figure 6:
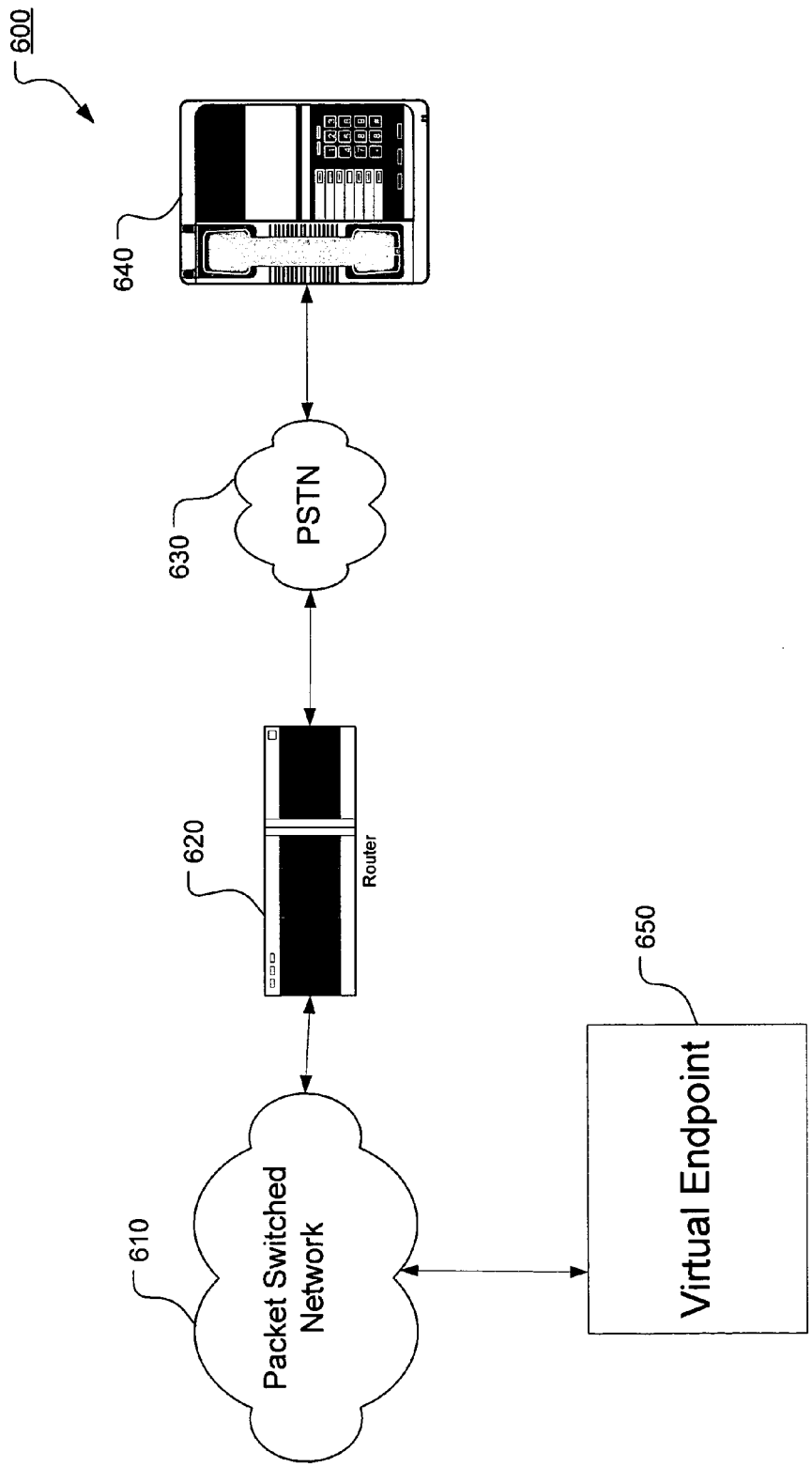
FIG. 6 illustrates an embodiment virtual endpoint.

FIG. 6 illustrates a virtual endpoint 650 that may comprise an embodiment of the present invention. Referring to the figure, packet switched network 610 is coupled with a router 620 which is in communication with a phone 640 through PSTN 630. A virtual endpoint 650 may be coupled with packet switched network 610. A virtual endpoint 650 may observe (sniff) a packet stream to see what a real endpoint might have done if presented with that same packet stream. An embodiment virtual endpoint 650 can observe the packet stream in real time. In another embodiment, virtual endpoint 650 observes the packet stream post-facto, based on packet sniffer trace files, for example.

An embodiment may include a system comprising an endpoint at the edge of a packet switched network, and a device to intercept packets in the packet switched network that are addressed to the endpoint, the device containing a virtual endpoint to record concealment events to provide an objective measure of media impairment. The present embodiment may include concealment events comprising a concealment vector and the objective measure may be concealed seconds. In an embodiment, the concealment vector may used to determine multiple levels of concealment, and in another embodiment a level of concealment may be user definable.

Figure 7:
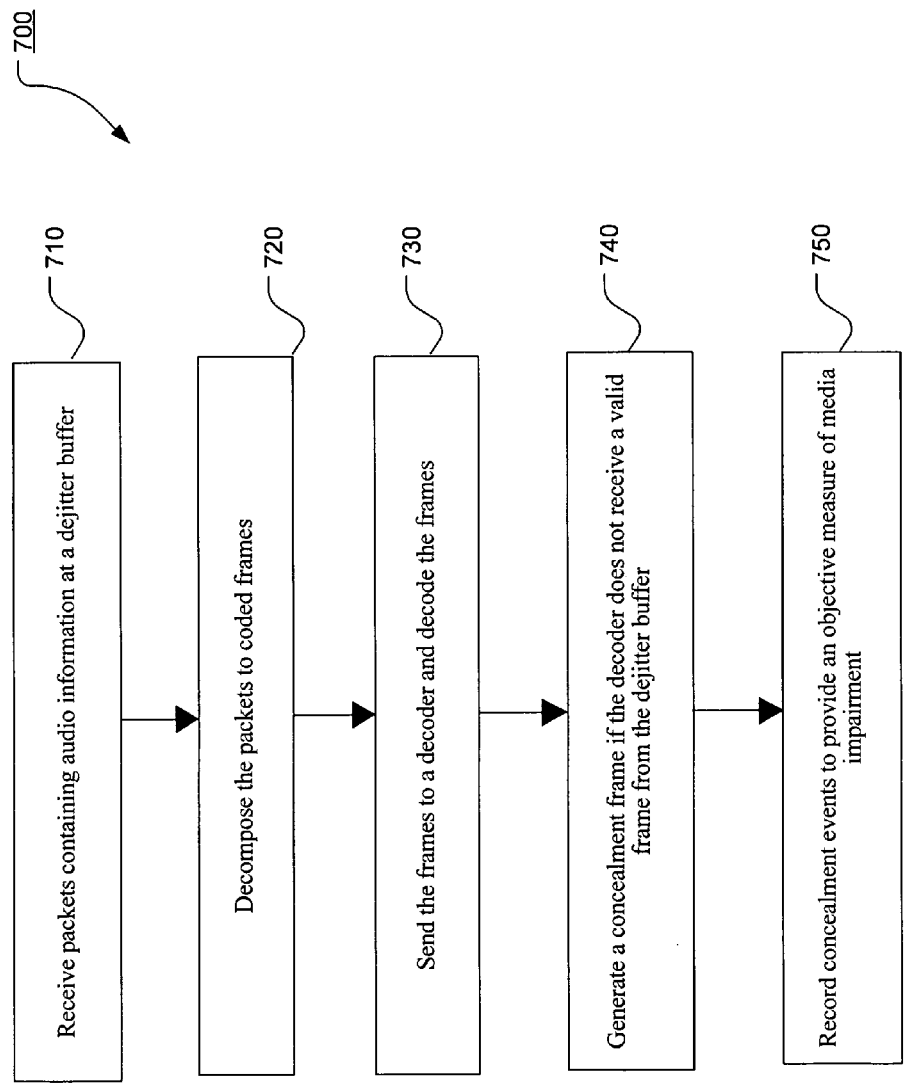
FIG. 7 illustrates an embodiment method to provide an objective metric of the loss of transmitted VoIP media frames.

FIG. 7 illustrates an embodiment method 700 to provide an objective metric of the loss of transmitted VoIP media frames. Referring to FIG. 7, and embodiment method may comprise receiving packets containing audio information at a dejitter buffer in block 710, decomposing the packets to coded frames as illustrated in block 720, sending the frames to a decoder and decoding the frames as shown in block 730, generating a concealment frame if the decoder does not receive a valid frame from the dejitter buffer in block 740, and recording concealment events to provide an objective measure of media impairment as illustrated in block 750. In the present embodiment the packets may be IP packets. In one embodiment, the coded frames may be G.729a coded frames.

One embodiment may further comprise generating a concealed second for any second that has greater than 0 ms of concealment. An embodiment may comprise generating a severely concealed second for any second that has greater than 50 ms of concealment. Another embodiment may comprise setting a user definable threshold to generate a user-defined concealed second.

The present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A method comprising:
   receiving packets containing audio information at a dejitter buffer;
   decomposing the packets to coded frames;
   sending the frames to a decoder and decoding the frames;
   generating a concealment frame if the decoder does not receive a valid frame from the dejitter buffer; and
   recording concealment events to provide an objective measure of media impairment, wherein recording concealment events comprises recording a situation in which the decoder compensates for defects in the coded frames.

2. The method of claim 1, wherein the packets are IP packets.

3. The method of claim 1, wherein the coded frames are at least one of G.711, G.726, G.729a, and G.723 coded frames.

4. The method of claim 1, further comprising generating a concealed second for any second that has greater than 0 ms of concealment.

5. The method of claim 1, further comprising generating a severely concealed second for any second that has greater than or equal to 50 ms of concealment.

6. The method of claim 1, further comprising setting a user definable threshold to generate a user-defined concealed second.

7. An apparatus comprising:
- a dejitter buffer to receive packets containing audio data;
- a decoder coupled with the dejitter buffer, the decoder to receive coded frames from the dejitter buffer and decode them; and
- a concealed seconds meter coupled with the dejitter buffer, the concealed seconds meter to record concealment events by the decoder to provide an objective measure of media impairment, a concealment event including a situation in which the decoder compensates for defects in the coded frames.

8. The apparatus of claim 7, wherein the decoder outputs PCM audio signals.

9. The apparatus of claim 7, wherein the packets are IP packets.

10. The apparatus of claim 7, wherein the concealment events comprise a concealment vector and the objective measure comprises concealed seconds.

11. The apparatus of claim 10 wherein the concealment vector may be used to determine multiple levels of concealment.

12. The apparatus of claim 11, wherein at least one level of concealment may be user definable.

13. The apparatus of claim 7, wherein the decoder generates a concealment event in response to not having a coded frame to decode.

14. A system comprising:
- an endpoint at the edge of a packet switched network;
- a device to intercept packets in the packet switched network that are addressed to the endpoint, the device containing a virtual endpoint to record concealment events to provide an objective measure of media impairment, a concealment event including a situation in which defects in the intercepted packets are compensated for.

15. The system of claim 14, wherein the concealment events comprise a concealment vector and the objective measure comprises concealed seconds.

16. The system of claim 15, wherein the concealment vector may be used to determine multiple levels of concealment.

17. The system of claim 16, wherein at least one level of concealment may be user definable.

18. The system of claim 14, wherein concealment events are generated in response to the device receiving packets that are judged to be invalid.

19. An apparatus comprising:
- means for receiving packets containing audio information at a dejitter buffer;
- means for decomposing the packets to coded frames;
- means for sending the frames to a decoder and decoding the frames;
- means for generating a concealment frame if the decoder does not receive a valid frame from the dejitter buffer; and
- means for recording concealment events to provide an objective measure of media impairment, a concealment event including a situation in which the decoder compensates for defects in the coded frames.

20. The apparatus of claim 19, wherein the means for recording concealment events to provide an objective measure of media impairment further comprise means to provide concealed seconds.

21. The apparatus of claim 19, wherein the means for recording concealment events further comprise means to provide a concealment vector to determine multiple levels of concealment.

22. The apparatus of claim 21, wherein at least one level of concealment may be user definable.

23. The apparatus of claim 19, the means for recording concealment events comprising means for counting the number of times that a concealment frame is generated by the concealment frame generating means.

* * * * *